United States Patent
Basso et al.

[11] Patent Number: 6,161,413
[45] Date of Patent: Dec. 19, 2000

[54] METHOD TO MAKE HOUSING FOR ROLLING STANDS AND HOUSINGS OBTAINED WITH THIS METHOD

[75] Inventors: Mauro Basso, Buttrio; Luca Sandrin, Terzo Di Aquileia; Fausto Drigani, Pozzuolo Del Friuli, all of Italy

[73] Assignee: Danieli & C. Officine Meccaniche SpA, Italy

[21] Appl. No.: 09/418,357

[22] Filed: Oct. 14, 1999

[30] Foreign Application Priority Data

Oct. 15, 1998 [IT] Italy ................. UD98A0178

[51] Int. Cl.⁷ ................................ B21B 31/00
[52] U.S. Cl. ........................................... 72/237
[58] Field of Search .................. 72/237, 225, 224

[56] References Cited

U.S. PATENT DOCUMENTS

| | | | |
|---|---|---|---|
| 4,107,971 | 8/1978 | Hunke | 72/237 |
| 5,802,904 | 9/1998 | Minnerop et al. | 72/237 |
| 5,839,314 | 11/1998 | Quitmann | 72/237 |
| 5,857,372 | 1/1999 | Sendzimir et al. | 72/237 |

FOREIGN PATENT DOCUMENTS

| | | |
|---|---|---|
| 447418 | 3/1968 | Switzerland. |
| 9626022 | 8/1996 | WIPO. |

OTHER PUBLICATIONS

Patent Abstracts of Japan vol. 008, No., 043 (M–279) Feb. 24, 1984 & JP 58 199607 A—Hitachi Seisakusho KK) Nov. 21, 1983.

*Primary Examiner*—Rodney A. Butler
*Attorney, Agent, or Firm*—Antonelli, Terry, Stout & Kraus, LLP

[57] ABSTRACT

Method to make housings for rolling stands and relative housings, the method providing to make each housing (10) by coupling and welding a pair of uprights (10*a*) and a pair of cross-pieces (10*b*) obtained individually as monolithic elements and welded together in correspondence with coupling surfaces, the welding involving at least part of the perimeter of each of the coupling surfaces and extending at least partly inside the thickness of the housing, and wherein it provides to achieve, in correspondence with each of the coupling surfaces of the uprights (10*a*) and the cross-pieces (10*b*), at least an inner cavity (11) made in the thickness of the housing (10), the inner cavities (11) being obtained by combining two semi-holes (111), or semi-cavities, open towards the outside and provided in mating positions on the respective surfaces, one of the upright (10*a*) and one of the cross-piece (10*b*), which are to be welded.

15 Claims, 2 Drawing Sheets

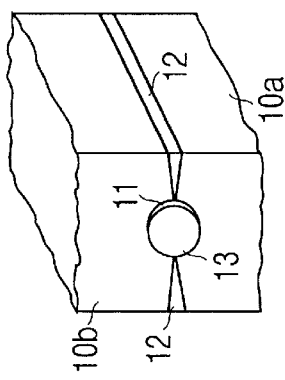
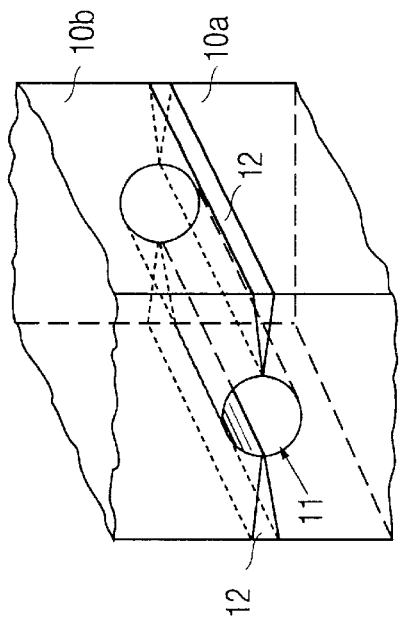
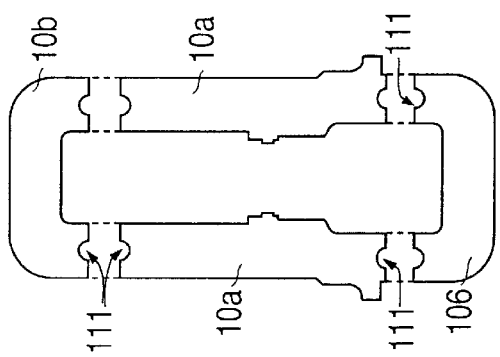
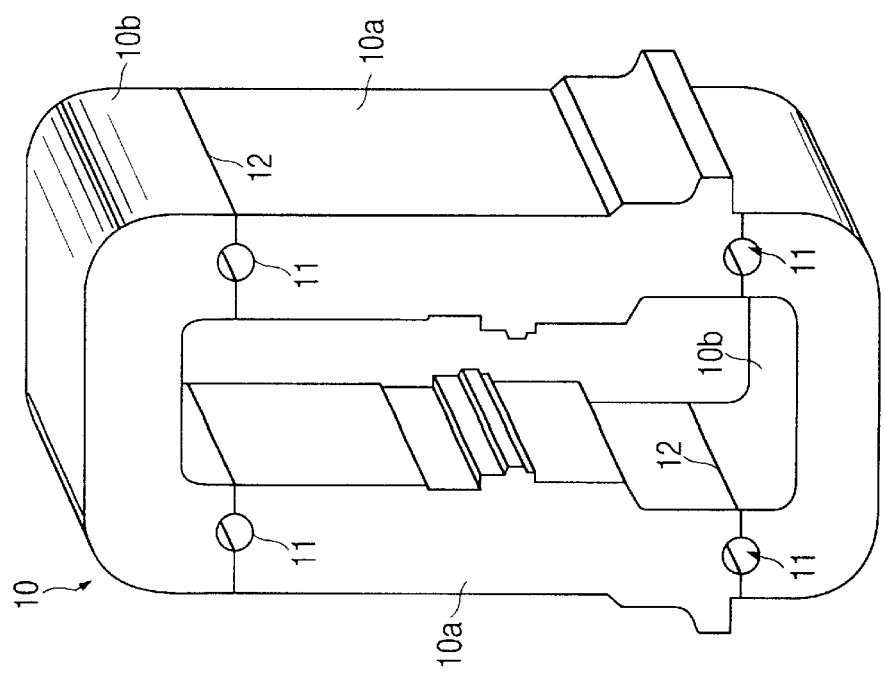

METHOD TO MAKE HOUSING FOR ROLLING STANDS AND HOUSINGS OBTAINED WITH THIS METHOD

FIELD OF THE INVENTION

This invention concerns a method to make housings for rolling stands and also the housings for rolling stands obtained with this method.

The invention is employed in the field of metallurgy to make the bearing structure, technically known as the housing, used in rolling trains and Drocessing lines to support and position the rolling rolls.

BACKGROUND OF THE INVENTION

In the state of the art, the housings used in rolling stands to support and position the rolls have a standardised conformation, substantially quadrilateral, wherein it is possible to distinguish two vertical uprights and two horizontal cross-pieces.

At present, these housings are produced using mainly two methods.

A first method provides to cast steel or iron to obtain the housings in their definitive configuration, in single pieces; a second method provides to obtain the housings by means of full penetration welding of steel casts forming the several component parts.

Both these methods, however, have some disadvantages.

To be more exact, the first method of producing housings entails a problem of quality connected with the difficulties of obtaining large casts without impurities, porosity and blow-holes which are typical of the casting process itself.

These quality defects, given the geometry of the housings, tend to collect in the proximity of the connection zones between the uprights and the cross-pieces where usually the mechanical stresses to which the housings are subjected during working conditions are greater compared with the other areas of the housing.

Moreover, because of the different cooling speed of the upright area and the cross-piece area, residual tensions are created in the aforesaid areas which are added to state of tension due to the working load.

On the one hand this reduces the safety factors and, on the other hand, it reduces the length of time the housings can function at maximum efficiency.

With this first method, moreover, the housing is made using a single material, for example steel or cast iron, while the stresses in the various sections of the housing are somewhat different, reaching higher values at the pass-line, that is, the ideal line of passage of the rolled stock, and in correspondence with the connection zones between the uprights and the cross-pieces.

Therefore, this would require zones with a diversified mechanical resistance according to the stresses which they have to bear.

Moreover, any inner defects, such as the inclusion of earth, worm holes and porosity can cause cracks, while the housings are in use, which would negatively affect the housing's ability to resist fatigue.

It should also be noted that, most times, these inner defects are very difficult to detect, especially because of the great thickness of the housing, the grain size of the material used and the surface finish which usually leaves the surfaces of the housings in their rough cast condition.

The second method, that is, the one which provides to make housings consisting of component parts made autonomously and then welded together with full penetration steel casts, eliminates in part the disadvantages of the first method, particularly those connected to the high dimensions of the casting.

Full penetration welding means welding which allows to completely restore the resistant section and wherein, since there is a complete continuity of the two connected pieces, there is a distribution of loads similar to that of a whole piece without any weld.

The second method, however, also has some disadvantages which negatively influence the resistance of the housings, and reduce their working life.

To be more exact, with this method three distinct zones are created: one welded, one cast and one thermally altered, each of which is characterised by different mechanical characteristics.

The high quantity of heat required by the full penetration welding process entails a considerable growth in the grain of the material used, with a consequent decline in the mechanical characteristics and particularly of the resilience and the resistance to fatigue.

Moreover, in order to guarantee a full penetration of the housings, a high volume of weld is used, which causes high shrinkage tensions which can be eliminated only by means of a normalisation treatment in the furnace. However, this treatment entails a considerable cost, caused by the lengthening of the production process inasmuch as, if it is to be efficient, the housing may have to remain in the furnace for more than a hundred hours.

With full penetration welding, moreover, there may arise problems connected with the elimination of the slag or the fact that one of the two ends to be welded may not be locally cast.

Inclusions of slag and stuck welds which derive therefrom cannot be eliminated with the heat normalisation treatment, and can cause the formation of cracks and breakages which are extremely difficult to detect because of the great thicknesses and the surface finishing of the housing, which is normally left rough.

Such cracks can in the long term even lead to a decline in the mechanical characteristics and therefore to a reduced safety in the functioning of the housing.

WO-A-96/26022 describes a housing for rolling stands consisting of uprights and cross-pieces which in turn consist of two parts, respectively an outer part and an inner part, mutually connected by means of reinforcing ribs; in the case of the vertical uprights the reinforcing ribs may also be absent.

The independent parts which constitute the uprights and cross-pieces define spaces between them, which allow to install conductors, electric cables and devices to support and move the rolls.

The two parts which make up the uprights are welded independently to the two parts which make up the cross-pieces, but with this solution a discontinuous zone is created in the center due to the lack of structural elements suitable to make the stand monolithic once it has been assembled.

The stand described in WO'022 is configured as a pair of rings, respectively inner and outer, constrained together only in correspondence with the vertical median axis and, optionally, astride the horizontal median axis.

This solution does not guarantee an adequate resistance to stresses, particularly in the case of unbalanced axial forces or in the case of pulsating stresses, and it is particularly susceptible to torsion on the vertical plane which affect the welds and, in the long term, compromise their efficiency.

With the welding between uprights and cross-pieces as used in WO'022, the inner zones near the root of the welds, which may have cracks or defects, are not removed with subsequent processing and therefore, with time, may lead to structural weakening and damage.

The reduced thickness of the uprights, given the same outer dimension, causes a reduction in the resistant section which is often unacceptable from the point of view of planning, since this reduction affects the average stress which can be supported by the uprights. Moreover, the welding procedure causes difficulties in the correct centering of the elements to be welded.

A further disadvantage is that the faces of the housings do not have a continuous surface, which creates problems when functional assemblies and accessories have to be attached to said faces.

The present applicant has devised. and embodied this invention to overcome the shortcomincgs of the methods of production as are known in the art, and to obtain further advantages as will be shown hereafter.

SUMMARY OF THE INVENTION

The invention is set forth and characterised in the respective main claims, while the dependent claims describe other characteristics of the main embodiment.

The main purpose of the invention is to provide housings with better and longer-lasting quality and mechanical characteristics than those of housings obtained with methods known to the art.

To be more exact, the housings according to the invention have no problems of porosity, inclusions, residual stresses, diversified cooling and therefore are more reliable and have a longer working life.

The method according to the invention provides to make the housings in several autonomous parts suitable to be reciprocally welded together by a process of partial penetration welding, that is, wherein the welding partly extends inside the thickness of the housing.

In a preferential embodiment of the invention, every housing consists of four parts, two vertical uprights and two horizontal cross-pieces, each part being a substantially monolithic element produced individually by casting, rolling or forging, or even with mixed processes of casting, rolling and forging.

In every case, the reduced dimensions of each of these acomponent parts compared with the whole housing guarantee a better quality in the product obtained, no matter which method of working is chosen.

According to the invention, in correspondence with each of the welding areas between the uprights and relative cross-pieces, there is an internal cavity on the housing which extends substantially transversely with respect to the plane defined by the coupling surfaces.

The inner cavity is through from one side of the housing to the other.

According to a variant, the inner cavity extends for a length which is less than the thickness of the housing.

In a preferential embodiment of the invention, the inner cavity is obtained by combining two semi-holes, open towards the outside, provided in mating and opposite positions on the two coupling surfaces, one on the upright and the other on the cross-piece, to be welded.

According to one embodiment of the invention, the through cavity is made in a central, or substantially central zone, of the coupling surfaces which are welded to each other, in order not to compromise the centering and the optimum functioning of the housing, in that there are fewer stresses due to the rolling loads in the said central zone.

According to the invention, the inner cavity in the welding zone allows to improve the quality of the perimeter welds made on the perimeter of the coupling surfaces inasmuch as it limits the penetration thereof to a lesser depth than full penetration welding.

According to one characteristic of the invention, when welding has been accomplished, and in the preferential case which provides for the presence of the through cavity, there are three possible alternative solutions.

The first solution provides to take the transverse inner cavity to a defined value of final diameter by means of a mechanical process or removing material, for example by reaming.

Once the transverse inner cavity has been taken to a defined value of final diameter, another solution provides to insert a reinforcing and stiffening pin inside, suitable to reduce the pulsating component of the stresses and to ensure the due structural continuity of the uprights and cross-pieces.

A third solution provides to use, together with the solution with a hole, at least an outer reinforcing ring which is applied on suitable protrusions provided on one or both the front surfaces of the uprights and cross-pieces in correspondence with the relative cavity.

The method according to the invention has a plurality of advantages compared with methods known to the art.

Due to the great reliability of the welding process itself, which is different from total penetration welding, the final quality in the welded areas, in terms of lack of defects, is higher than that obtained with known methods.

By making a transverse inner cavity in the areas which are the most critical for stress and deformations, it is possible to eliminate any possible dangers connected with porosity and inclusions which are typical of casting.

In this case, it is therefore not necessary to provide in these areas the feedheads which are normally included in housings obtained entirely by means of casting.

The working to size of the transverse inner cavity which is done after welding is completed, taking the final diameter of the cavity to a higher value than the initial value, allows to remove a defined thickness of material which corresponds to the root zone of the weld; in this way any possible defective zones are removed, for example zones containing cracks or similar, which is a great advantage in terms of quality and the inner resistance of the housing.

In the welded zones, the weld material is certainly better in terms of resistance to yield stresses and resilience of the base material used for the housings, and this entails a better behaviour under working conditions of the housing itself in a zone which is particularly subject to stresses.

Thanks to the through cavity, it is possible, before the pin is inserted or even if no pin is provided, even when the plant is working and without dismantling the stand, to detect possible defects which might be present in the join zones inasmuch as each of these zones can be controlled on four sides, either from outside or from the inside or through the inner cavity, both with surface methods (PT: penetrant test, or MT: magnetic particles test) and also with volume methods (UT: ultrasonic test).

Moreover, the reduced volume of welding involved in joining the parts of the housing compared with the full penetration solution creates fewer residual tensions in the areas of welding.

Using a SAW (Submerged Arc Welding) system, moreover, it is possible to obtain a better refinement of the grain in the welded areas compared with what is obtained in the same areas in a housing made entirely by casting or in a housing wherein the various parts are joined together by means of full penetration welding.

In the SAW procedure, the heat to melt the weld material is provided by an arc which strikes between the piece to be welded and the weld material itself.

The function of protecting the arc is performed by a layer of granular and meltable flux which is deposited above and in front of the arc and which completely covers the melted zone making it invisible to the operator.

The weld material is in the form of wire wound into a coil which is unwound in a controlled manner.

With the SAW procedure, it is possible to use high values of current intensity and this encourages the penetration and reduction of welding times; these characteristics make this procedure particularly suitable for welding large thicknesses.

In the case when a pin is inserted in the through transverse inner cavity (which is particularly useful when the housing is subject to shearing tensions in the direction of rolling), the pressure exerted by this pin on the inner surface of the transverse inner cavity is suitable to modify the load spectrum, reducing the amplitude of the stresses ($\Delta\sigma max$).

In fact, the stresses or loads which act on the housing are not continuous, but are characterised by a pulsing development which has a minimum value of $\sigma min$ when the slab is not passing between the rolls, and therefore no working load is applied, and a maximum value of $\sigma max$ when a working load is applied.

In the event that no pin is inserted in the cavities, the minimum value of $\sigma min$ is equal to zero, and therefore the amplitude of the stresses, taken as the difference between $\sigma max$ and $\sigma min$, is equal to $\sigma max$.

When the pin is included, the value $\sigma min$ assumes a positive value, different from zero inasmuch as the interference from the pin puts the housing block under tension; therefore, the difference $\Delta\sigma max$ assumes a value which is less than in the case where the pin is not inserted.

BRIEF DESCRIPTION OF THE DRAWINGS

These and other characteristics of the invention will become clear from the following description of a preferred form of embodiment, given as a non-restrictive example, with reference to the attached drawings wherein:

FIG. 1 is a three-dimensional view of a housing for rolling stands or for processing lines according to the invention;

FIG. 2 is a front view of an exploded view of FIG. 1;

FIG. 3 shows an enlarged detail of FIG. 1;

FIG. 4 shows a variant of FIG. 3;

DETAILED DESCRIPTION OF THE PREFERRED EMBODIMENT

Figure 8:
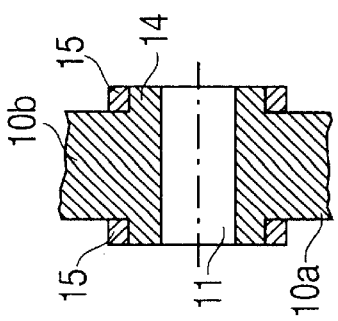
FIG. 8 shows a cross section from B to B of FIG. 7.

With reference to FIG. 1, a housing 10 according to the invention for rolling stands or processing lines comprises four parts, respectively two uprights 10a and two cross-pieces 10b, each made autonomously (FIG. 2) with a process of casting, rolling or forging, or even with a mixed process of casting, rolling and forging.

As shown in FIG. 2, on every association end or coupling surface of the uprights 10a and the relative cross-pieces 10b, respective semi-holes or cavities 111 are provided in corresponding positions, facing each other and open towards the outside.

In this case, the semi-holes 111 have a substantially semi-circular section, but this is only an example, as the semi-holes 111 can have any other different section, for example partly oval, elliptical or similar.

The semi-holes 111 may be made by means of mechanically removing material, from the individual parts or with the parts already partly coupled, or they may be provided directly in the impressions of the molds.

Parts 10a and 10b are then coupled together, making the perimeter of the coupling surfaces and the respective semi-holes 111 coincide so as to obtain a housing 10 equipped with four inner cavities 11 passing from side to side of the thickness of the housing 10 in correspondence with each join zone between the uprights 10a and the cross-pieces 10b.

The inner cavities 11, therefore, are studied in their form and size, in an opportune manner, so as to guarantee the correct centering of the elements which are to be welded and so as to ensure efficient welding operations according to the thicknesses, the material used to construct the uprights and cross-pieces and the type of welding method adopted.

The method according to the invention then provides that the join zones are welded peripherally together with two welding beads 12 provided on opposite sides with respect to the inner cavity 11.

With the method according to the invention, the depth of penetration of the welding bead 12, thanks to the presence of the cavity 11, is much less than the depth of a traditional full penetration welding; this gives the advantage of a better quality in terms of a lack of defects such as porosity, inclusions, residual stresses and diversified cooling, and at the same time guarantees the functionality of the housing.

When welding is completed, the method according to the invention provides to take the diameter of the cavity 11 to a defined final value, greater than the initial diameter value, by means of the mechanical removal of material, for example by reaming.

This allows to eliminate a defined thickness of material, in the areas of the root of the respective welding beads 12, which might have defects such as cracks or suchlike or wherein in any case the weld might include inferior quality characteristics.

In the embodiment shown in FIG. 4, in each ground inner cavity 11 there is inserted, substantially with interference, a reinforcing pin 13 with a section substantially mating with the transverse section of the cavity 11 itself and substantially coinciding in length with the thickness of the housing 10.

The function of the pin 13 is on the one hand to guarantee the centering and structural continuity of the uprights 10a and the cross-pieces 10b, and on the other hand to eliminate or at least reduce the pulsating component of the stresses deriving from the working loads.

Figure 6:
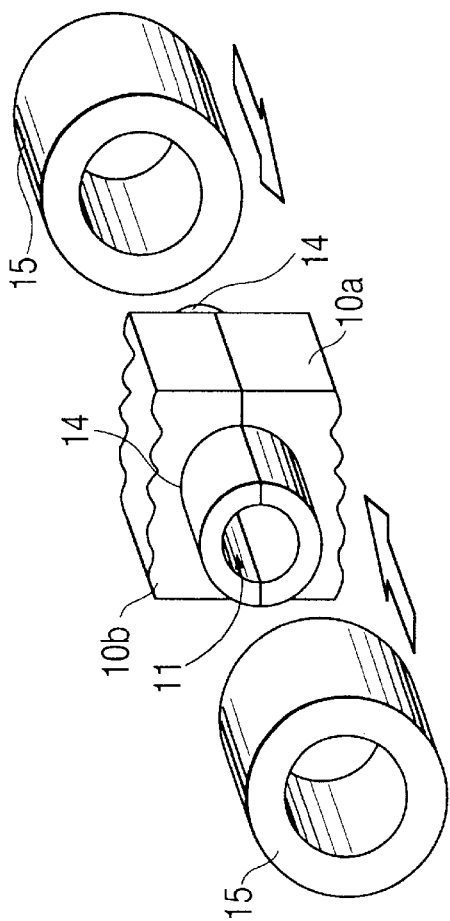
FIG. 6 shows an exploded detail of FIG. 5.
Figure 7:
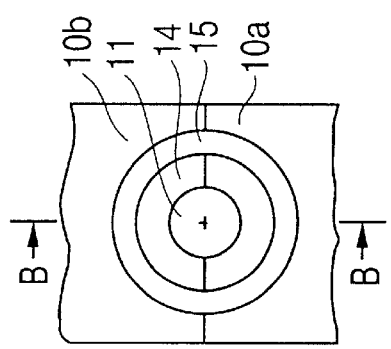
FIG. 7 shows a part view from A of FIG. 5.
Figure 5:
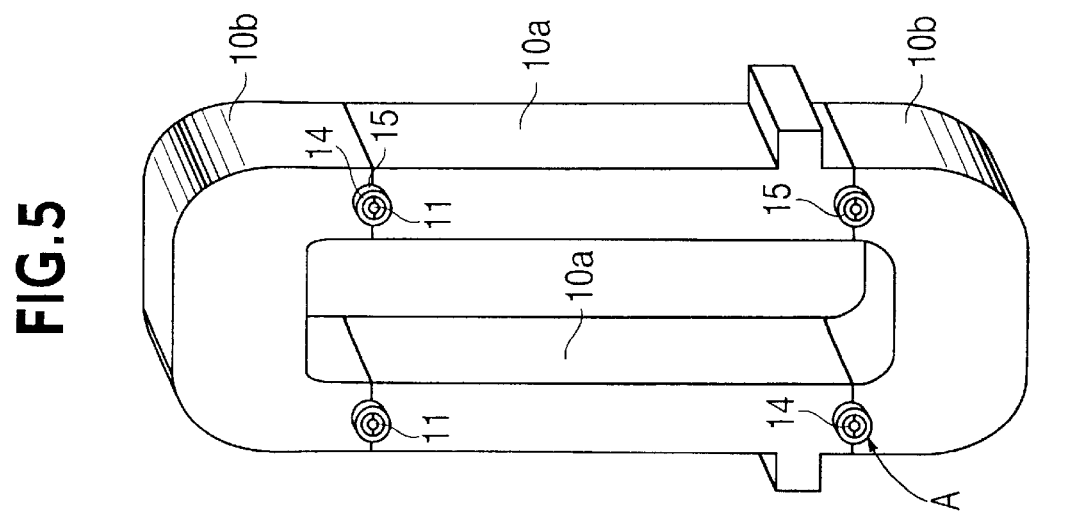
FIG. 5 shows a variant of FIG. 1.

In the further embodiment shown in FIGS. 5 to 8, each of the uprights 10a and the cross-pieces 10b has, in a single body therewith, protrusions 14 facing outwards substantially continuous in form with the respective semi-hole 111.

The protrusions 14 may be included on one or both the front surfaces of the respective uprights 10a and cross-pieces 10*b*, just as they may be included both in the upper part and also in the lower part of the rolling stand 10.

When the uprights 10*a* and cross-pieces 10*b* have been coupled, and when welding has been completed, respectively stiffening and reinforcing rings 15 are applied onto the protrusions 14, substantially by interference keying; the rings 15 make the coupling even more solid and ensure a greater resistance to stresses deriving from the working load.

It is obvious that modifications and additions may be made to this invention, without departing from the spirit of the invention disclosed herein.

What is claimed is:

1. Method to make housings for rolling stands and processing lines, comprising:

providing a pair of uprights and a pair of cross-pieces, each of said uprights and said cross-pieces being a substantially monolithic element having defined coupling surfaces, each of said coupling surfaces having a semi-cavity open towards the outside;

assembling said pair of uprights and said pair of cross-pieces together, with said cross-pieces being spaced from each other and provided between said uprights, to achieve, in correspondence with said coupling surfaces between each of said uprights and each of said cross-pieces, at least an inner cavity made in the thickness of the housing, said inner cavities obtained by combining two, of said semi-cavities in mating positions on the respective coupling surfaces; and welding said cross-pieces to said uprights along at least part of a perimeter of respective mating coupling surfaces and extending at least partly inside the thickness of the housing.

2. Method as in claim 1, characterized in that said inner cavities are provided as through cavities in the thickness of the housing and in a substantially central position with respect to said coupling surfaces.

3. Method as in claim 1, further comprising, after welding, removing material around said cavities to take a diameter of said cavities to a higher value than an initial value of the diameter in order to remove zones near a root of the weld.

4. Method as in claim 1, further comprising inserting a pin inside each of said cavities to stiffen, center and give structural continuity.

5. Method as in claim 1, characterized in that each of said uprights and/or cross-pieces is provided by means of a casting process.

6. Method as in claim 1, characterized in that each of said uprights and/or cross-pieces is provided by means of a forging process.

7. Method as in claim 1, characterized in that each of said uprights and/or cross-pieces is provided by means of a rolling process.

8. Method as in claim 1, characterized in that each of said uprights and/or cross-pieces is provided by means of a mixed process of casting-forging-rolling.

9. Method as in claim 1, characterized in that the welding is carried out by Submerged Arc Welding.

10. Method as in claim 1, further comprising providing protrusions on the front surfaces of said uprights and said cross-pieces facing towards the outside and extending substantially in continuous form with the r espective semi-cavity so that a ring-shaped protrusion is formed by two combined semi-cavities when said uprights and said cross-pieces are assembled, and applying a stiffening ring on each of said ring-shaped protrusions.

11. Housing for rolling stand consisting of a pair of uprights and a pair of cross-pieces obtained individually as substantially monolithic elements and welded together in correspondence with definec coupling surfaces, said weld involving at least part of the perimeter of each of said coupling surfaces and extending at least partly inside the thickness of the housing, the housing being characterized in that it comprises, in correspondence with each of said coupling surfaces of said uprights and said cross-pieces, at least a cavity made in the thickness of the housing and obtained by combining two semi-holes, or semi-cavities, open towards the outside and provided in mating positions on the respective surfaces, one of the upright and the other of the cross-piece, which are to be welded.

12. Housing for rolling stand as in claim 11, characterized in that the cavity is a through hole in the thickness of the housing and is located in a substantially central position with respect to the relative coupling surfaces of the upright and the respective cross-piece.

13. Housing as in claim 11, further comprising a pin inserted in each of said the inner cavities, the function of said pin being to stiffen, center and give structural continuity.

14. Housing as in claim 11, characterized in that on the front walls of said uprights and/or said cross-pieces, substantially in correspondence with at least one of said cavities, there are outward-facing protrusions defining means to anchor stiffening and reinforcing rings by interference therewith.

15. Housing as in claim 14, characterized in that said protrusions extend substantially in continuous form with the relative cavity.

* * * * *